United States Patent [19]

Foster

[11] Patent Number: 4,899,870
[45] Date of Patent: Feb. 13, 1990

[54] RECIPROCATING FLOOR CONVEYOR WITH SNAP-ON FLOOR MEMBERS

[76] Inventor: Raymond K. Foster, P.O. Box 1, Madras, Oreg. 97741

[21] Appl. No.: 150,384

[22] Filed: Jan. 29, 1988

Related U.S. Application Data

[63] Continuation-in-part of Ser. No. 68,932, Jul. 1, 1987.

[51] Int. Cl.$^4$ .............................................. B65G 25/04
[52] U.S. Cl. .................................... 198/750; 414/525.1
[58] Field of Search .................... 198/750, 773–775; 414/525 R, 525 B, 525.1; 403/386, 387, 390

[56] References Cited

U.S. PATENT DOCUMENTS

| | | | |
|---|---|---|---|
| 4,143,760 | 3/1979 | Hallstrom | 198/750 |
| 4,144,963 | 3/1979 | Haustrom | 198/750 |
| 4,184,587 | 1/1980 | Hallstrom | 198/750 |
| 4,474,285 | 10/1984 | Foster | 198/750 |
| 4,492,303 | 1/1985 | Foster | 198/750 |
| 4,508,211 | 4/1985 | Foster | 198/750 |
| 4,679,686 | 7/1987 | Foster | 198/750 |
| 4,749,075 | 6/1988 | Foster | 198/750 |

Primary Examiner—Robert J. Spar
Assistant Examiner—D. Glenn Dayoan
Attorney, Agent, or Firm—Delbert J. Barnard

[57] ABSTRACT

Plug-together joints are formed between floor members (10, 10') and drive beams (18, 18'). These connections may comprise a pin or insert (72) secured to the drive beam (18) and a box or socket (52, 54) secured to the floor member (10). Or, it may comprise a box or socket (176, 178) secured to the drive beam (18') and an insert or pin (188) secured to the floor member (10'). Alternatively the connection may comprise an abutment block (198) secured to the floor member (10") which longitudinally engages between vertical push/pull members (210, 212), or a vertical projection (226) secured to the drive beam (18") which engages between a pair of abutment blocks (198) secured to the floor member (10"). The plug-together connection is used in a reciprocating floor conveyor of a type having slide bearings (122) for the floor members (10, 10') which allow the floor members (10, 10') to be snapped into place from above. The floor may also include hold down members (90) which are secured to the guide beams (14) for the floor members (10, 10') and which are also constructed to allow the floor members (10, 10') to be snapped into place from above. The hold down members (90) include hold down wings (100, 102) which, when the floor member is in place, locate lower edges (104, 106) above inner edge portions (84, 82) of the floor member (10, 10'). This puts the hold down wings (100, 102) into positions to block upward movement of the floor members (10, 10').

7 Claims, 14 Drawing Sheets

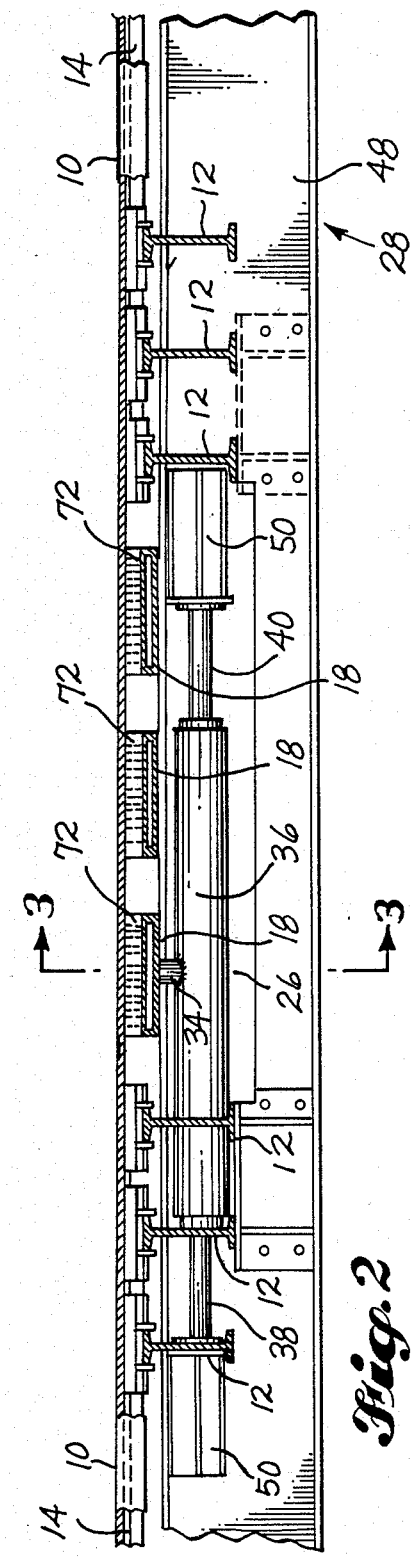
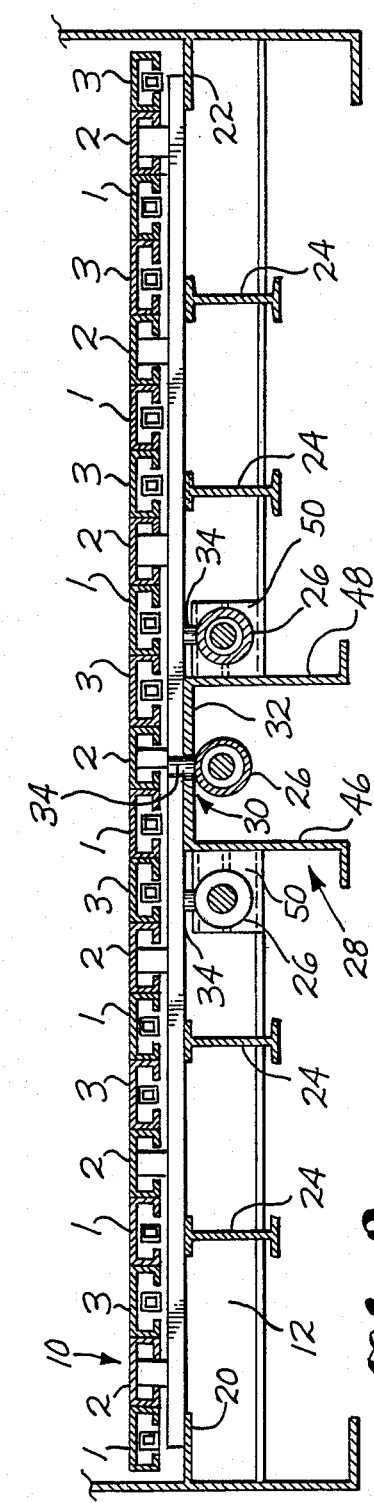

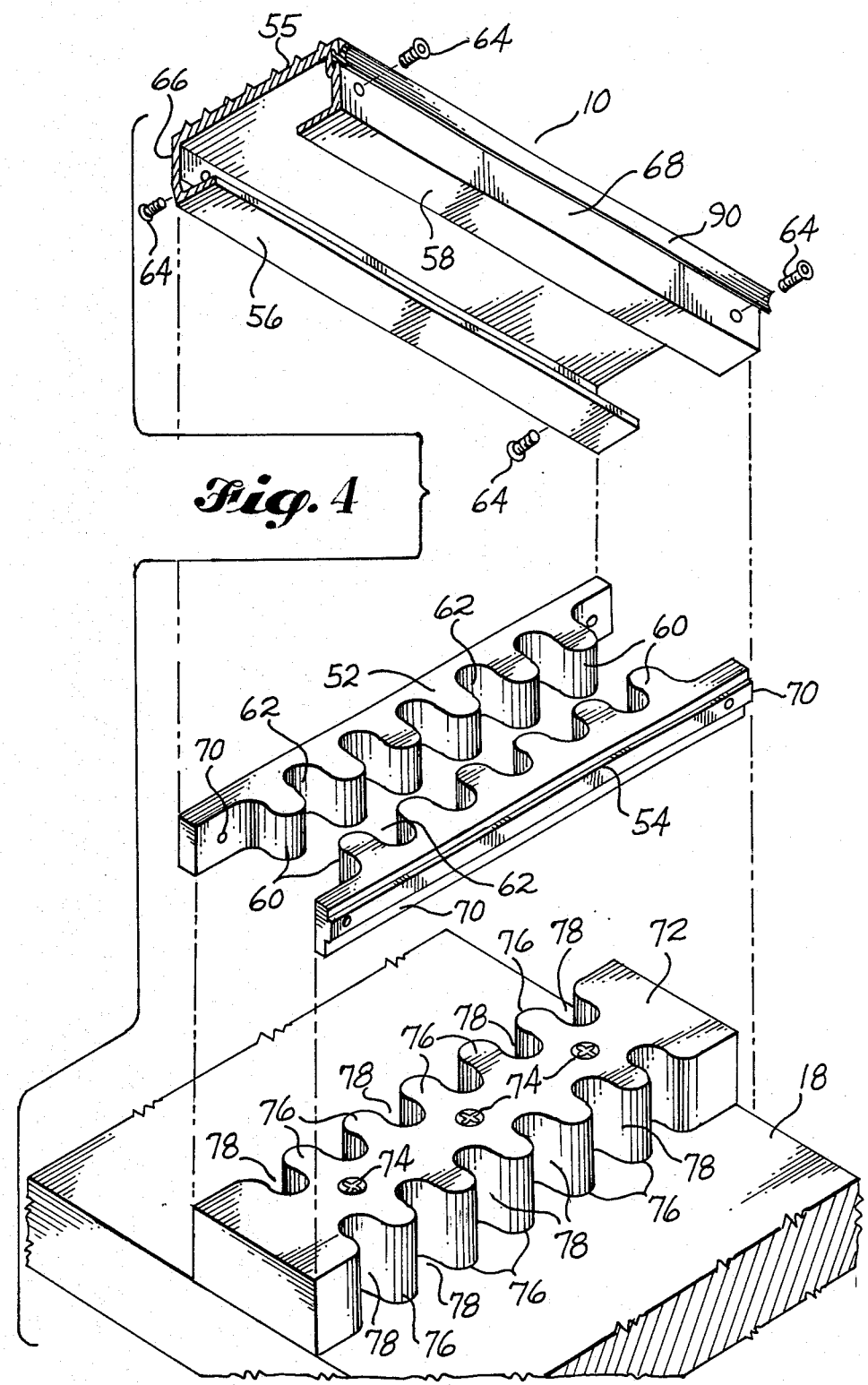

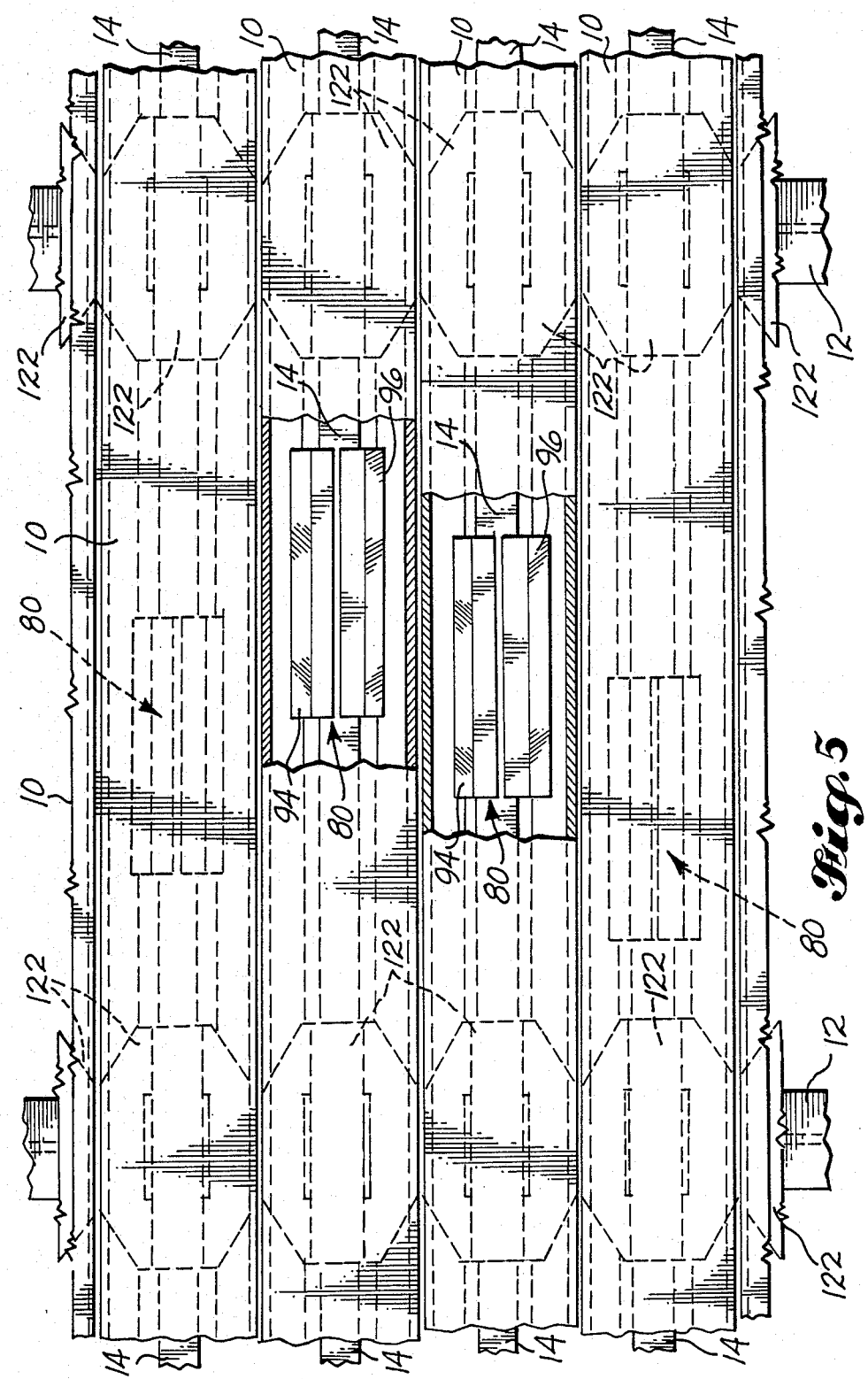

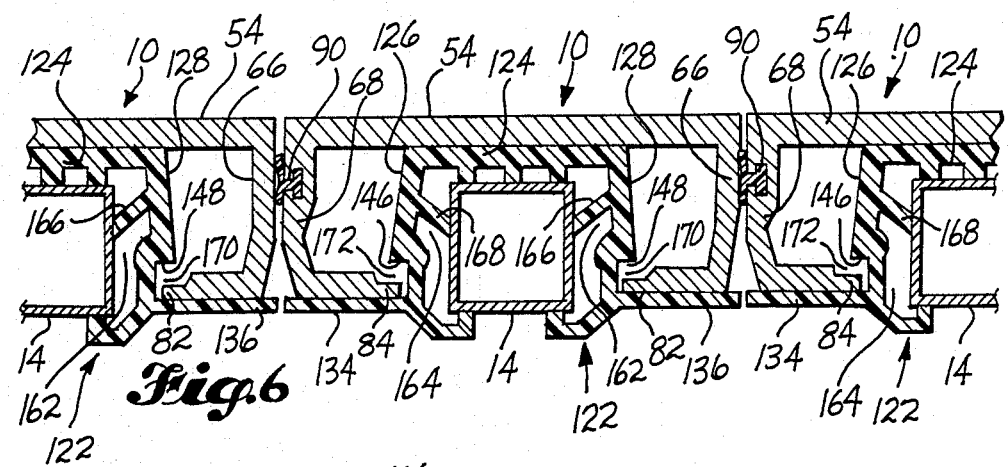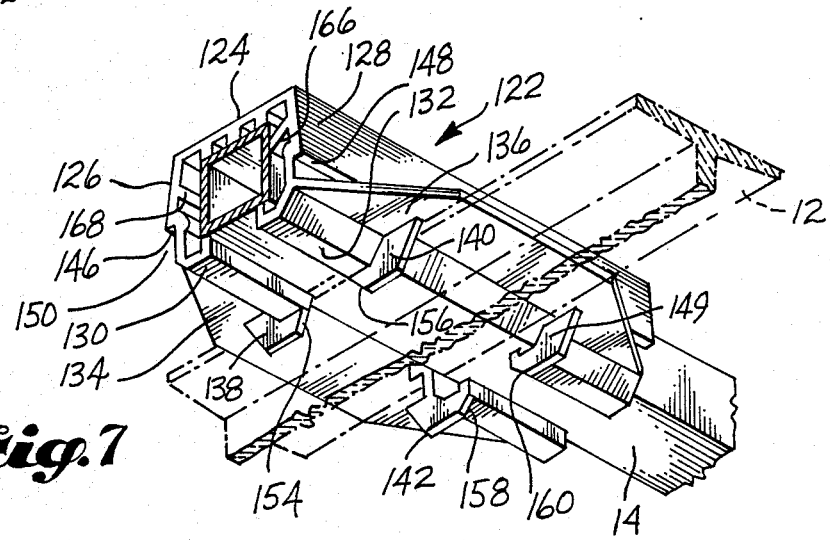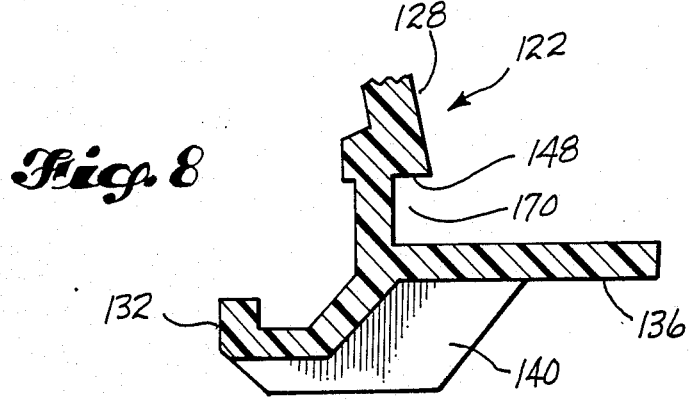

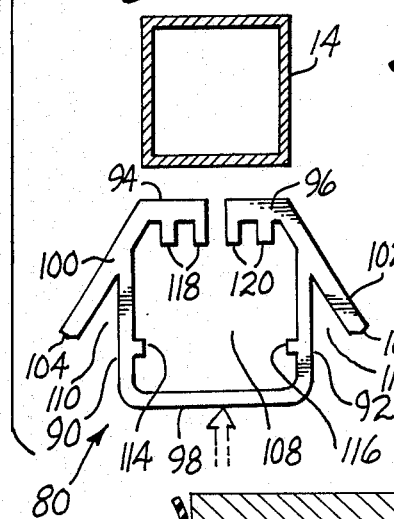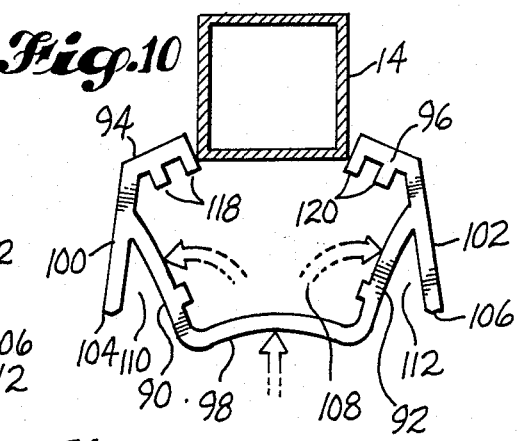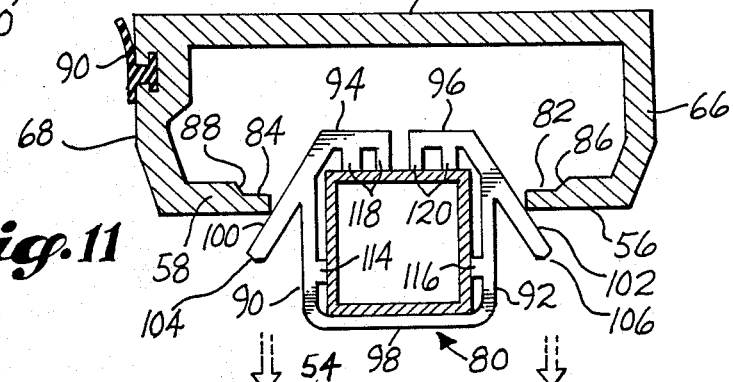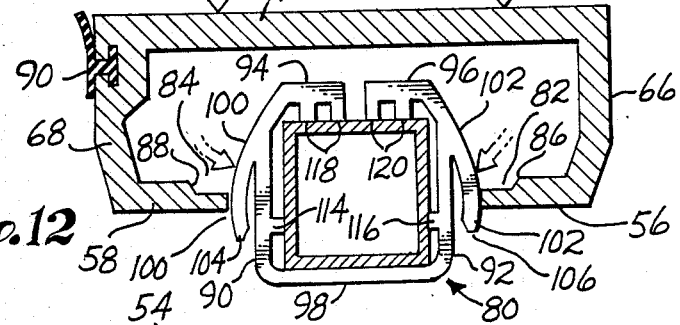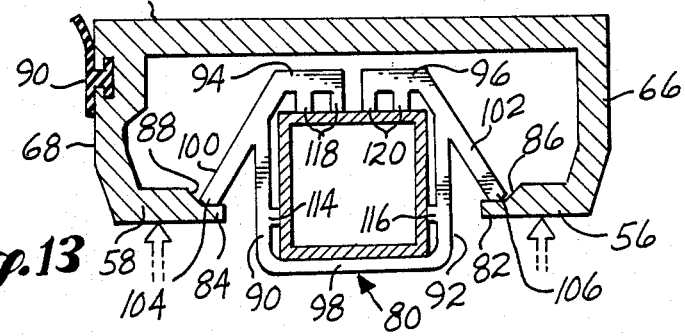

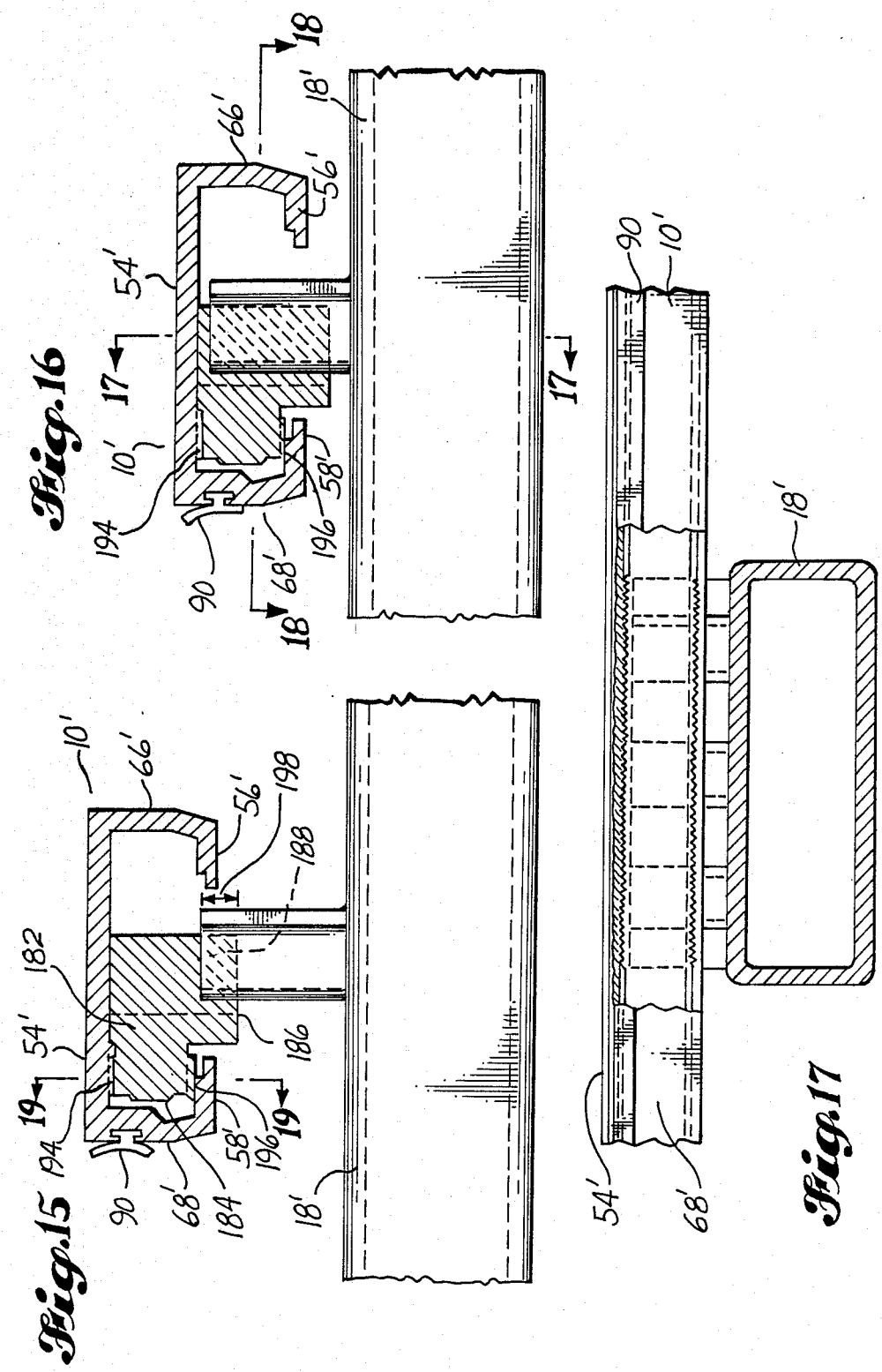

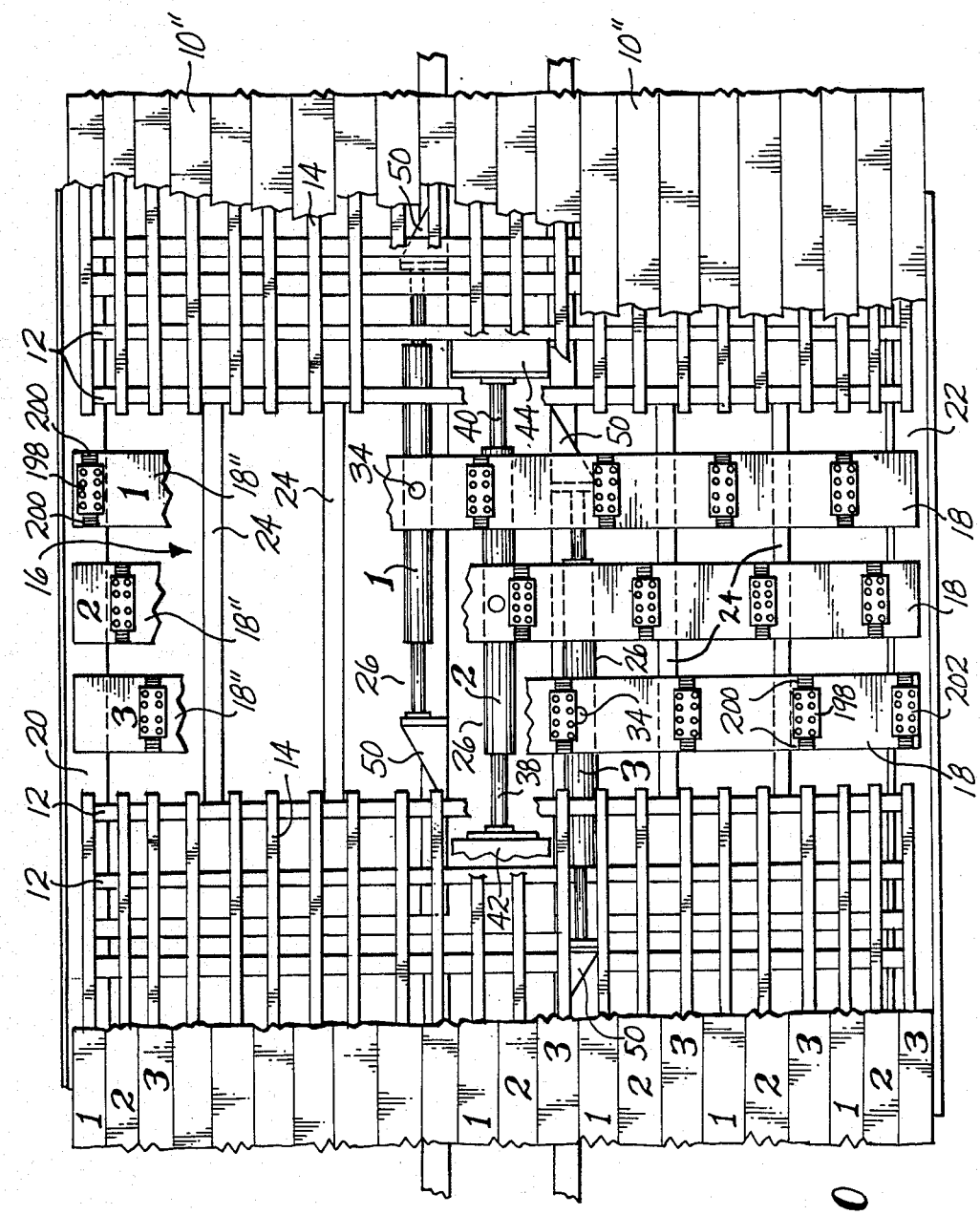

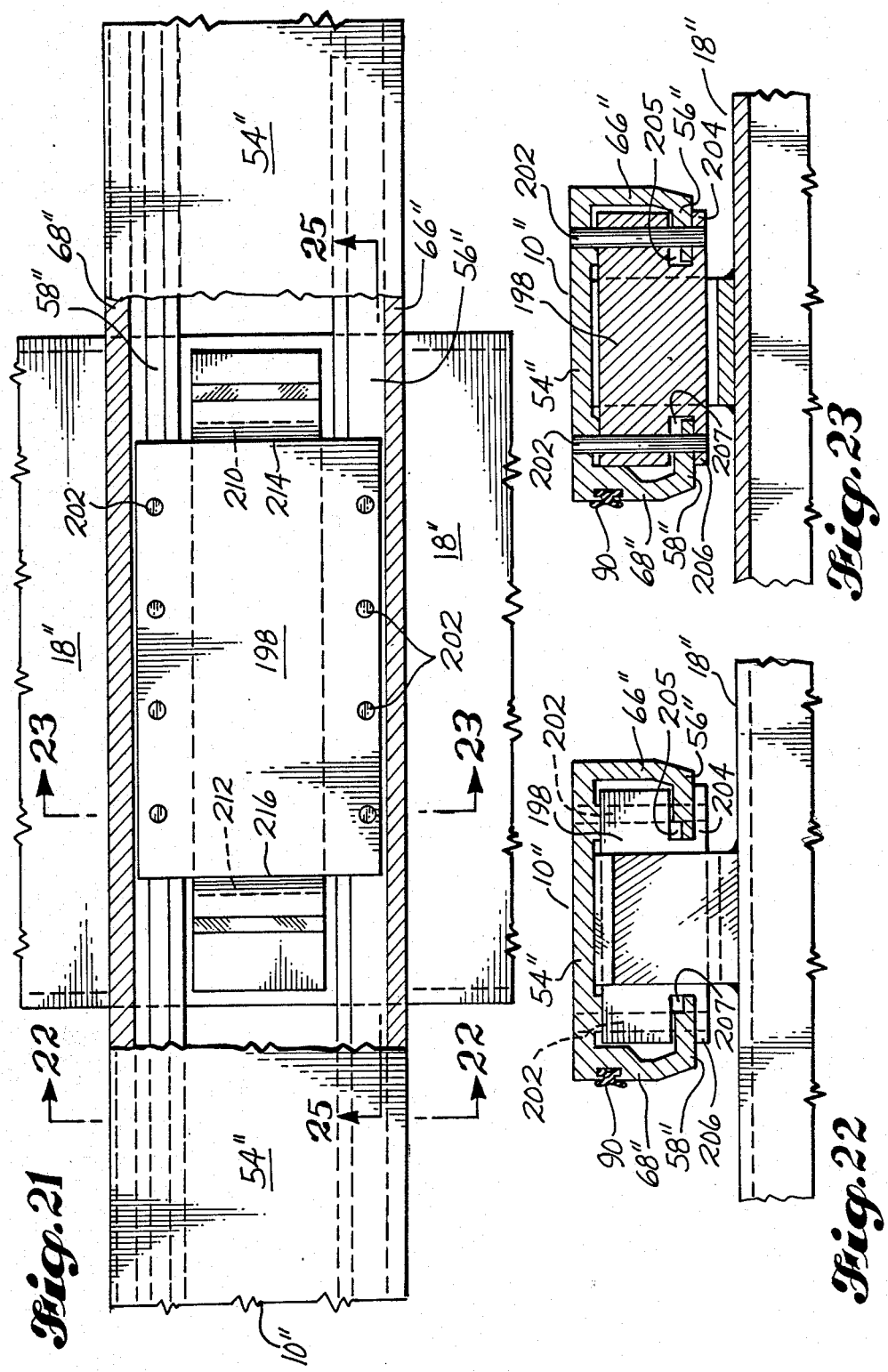

RECIPROCATING FLOOR CONVEYOR WITH SNAP-ON FLOOR MEMBERS

This application is a continuation-in-part of Ser. No. 07/068,932 filed July 1, 1987.

TECHNICAL FIELD

This invention relates to reciprocating floor conveyors. More particularly, it relates to a plug-together connection between the floor members and a drive member, and an overall construction allowing the floor members to be snapped into place from above.

1. Related Applications

My copending application Ser. No. 680,069, filed Dec. 10, 1984 now U.S. Pat. No. 4,679,686, and entitled "Bearing System for Reciprocating Floor Conveyor", and my copending application Ser. No. 59,376, filed June 4, 1987 now U.S. Pat. No. 4,785,929, and entitled "Bearing System for Reciprocating Floor Conveyor", each relate to ways of constructing a slide bearing for a reciprocating floor member in such a way that the floor member can be pushed down from above and snapped into place on its slide bearings.

My copending application Ser. No. 58,156, filed June 4, 1987 now U.S. Pat. No. 4,749,075, and entitled "Hold Down Member for a Reciprocating Floor Conveyor" relates to the provision of hold down members which are secured to guide beams for the floor members and which function for resisting upward movement of the floor members up off their slide bearings and/or the guide beams. The hold down members are also constructed to allow the floor members to be snapped into place from above.

2. Background Art

Heretofore it has been the practice to connect the floor members of reciprocating floor conveyors to transverse drive beams or other drive members by the use of bolts which extend through openings in the floor members. By way of example, installations of this type are disclosed by U.S. Pat. No. 4,184,587, granted Jan. 22, 1980, to Olaf A. Hallstrom and by my U.S. Pat. No. 4,492,303, granted Jan. 8, 1985 and entitled Drive/Guide System for a Reciprocating Floor Conveyor.

The use of bolts requires a considerable amount of workman's time and thus adds significantly to the cost of installing a reciprocating floor conveyor. In addition, in many installations it is difficult to gain access to the underneath sides of the connector members. In some installations the access problem has been solved by making the connector members considerably longer than they need to be, thus adding to the cost of materials.

The principal object of the present invention is to provide a plug-together connection between the floor members and the drive means, so that the floor members can be installed by pushing them into place from above, without the need of installing a large number of bolts.

It is a further object of this invention to provide a load transferring engagement between the floor members and the drive means which maintains correct vertical spacing between the floor members and the drive means and allows limited lateral movement of the floor member for adjusting its position relative to other floor members.

DISCLOSURE OF THE INVENTION

A reciprocating floor conveyor is known to comprise a plurality of floor members, each of which is supported for back and forth longitudinal travel. A drive mechanism moves the floor members in one direction for advancing a load and retracts them in the opposite direction.

According to the invention, a plug-together connection is provided between each floor member and a drive member of the drive mechanism. The connection comprises a first connector component that is a part of a floor member and a complementary second connector component that is a part of the drive member. Each floor member is positioned for movement down onto a support and guide means with its connector component vertically aligned with the complementary connector component on the drive member. The floor member is then merely moved downwardly to place it on its support and guide means with its connector component in a connecting engagement with the connector component on the drive mechanism.

According to another aspect of the invention, a vertically plugged-together longitudinal engagement is provided between each floor member and a drive member of the drive mechanism. Each floor member has an abutment which engages with a push/pull means on a drive member to cause the back and forth directional motion of the drive member to be transferred to corresponding floor members while allowing a slight lateral float of the floor members.

In accordance with another aspect of the invention, the support and guide means for each floor member comprises a plurality of longitudinally spaced apart slide bearings on a guide beam. The slide bearings are constructed to lock onto the floor member when it is in place. They are also constructed to allow the floor member to be snapped into place from above.

In accordance with yet another aspect of the invention, at least one hold down member is attached to at least some of the guide beams. The hold down member is constructed to allow a snap-on installation of the floor member. The hold down member includes hold down wings having lower edges which are spaced apart laterally a distance that is wider than the space between bottom flange portions of the floor member. The downward movement of the floor member causes the flanges to bend the wings inwardly an amount sufficient to allow the bent down wings to pass relatively through the space between the bottom flanges. The hold down wings are stiff enough so that following movement of the bottom flanges into positions below the lower edges of the hold down wings, the hold down wings will swing outwardly into positions over the bottom flanges of the floor member. The wings are attached to sidewalls which in turn are attached to a bottom wall which is located below the guide beam. An upward movement of the floor member is resisted by its contact with the hold down wings. The force applied by the floor member to the hold down wings is transmitted to the bottom wall of the hold down member which is blocked against movement by the guide beam.

These and other features, objects, characteristics and advantages of the invention will hereinafter be described as a part of the description of the best mode of the invention.

BRIEF DESCRIPTION OF THE DRAWINGS

Like reference numerals are used to designate like parts throughout the several views of the drawing, and:

FIG. 2 is a sectional view taken substantially along line 2—2 of FIG. 1;

FIG. 3 is a sectional view taken substantially along line 3—3 of FIG. 1;

FIG. 4 is an exploded isometric view of a plug-together connection between a floor member and the transverse drive beam;

FIG. 5 is a fragmentary enlarged scale top plan view of the floor, showing bearings and hold down members by hidden lines, with a central foreground portion broken away for the purpose of showing a pair of hold down members in top plan;

FIG. 6 is a fragmentary sectional view taken substantially along line 6—6 of FIG. 5;

FIG. 7 is an isometric view showing a bearing installed on a guide beam and a portion of a transverse support beam;

FIG. 8 is an enlarged scale fragmentary view of a lower side portion of the bearing, with the bearing being shown in section;

FIG. 9 is a transverse sectional view through a guide beam, showing a hold down member in end elevation, positioned below the guide beam; FIG. 10 is a view like FIG. 9, but showing the hold down member spread apart at its top and being in the process of being moved upwardly onto the guide beam;

FIG. 11 is a view like FIGS. 9 and 10, but showing the hold down member installed on the guide beam and showing a floor member sitting down on the wings of the hold down member;

FIG. 12 is a view like FIGS. 9-11, but showing the floor member being moved downwardly and the bottom flanges of the floor member pushing on the wings of the hold down member and swinging them inwardly;

FIG. 13 is a view like FIGS. 9-12, but showing the floor member installed and showing the lower edges of the hold down wings of the hold down member positioned above inner edge portions of the bottom flanges of the floor member;

FIG. 15 is a fragmentary view of the reciprocating floor element shown by FIG. 14, with the floor member shown in an elevated attitude which it takes when it is initially set down onto the bearings of its guide beam;

FIG. 16 is a view like FIG. 15, but showing the attitude of the floor member after it has been moved down and snapped into position on the bearings;

FIG. 17 is a view taken substantially along line 17—17 of FIG. 16, with a foreground portion of the floor member cut away;

FIG. 20 is a top plan view of a reciprocating floor conveyor with portions cut away for the purpose of better illustrating other portions;

FIG. 21 is a fragmentary enlarged scale top plan view of a floor member and a drive member with a portion of the floor member cut away for the purpose of showing an engaged abutment block and push/pull cradle in top plan;

FIG. 22 is a sectional view taken substantially along line 22—22 of FIG. 21;

FIG. 23 is a sectional view taken substantially along line 23—23 of FIG. 21;

BEST MODE FOR CARRYING OUT THE INVENTION

Figure 1:
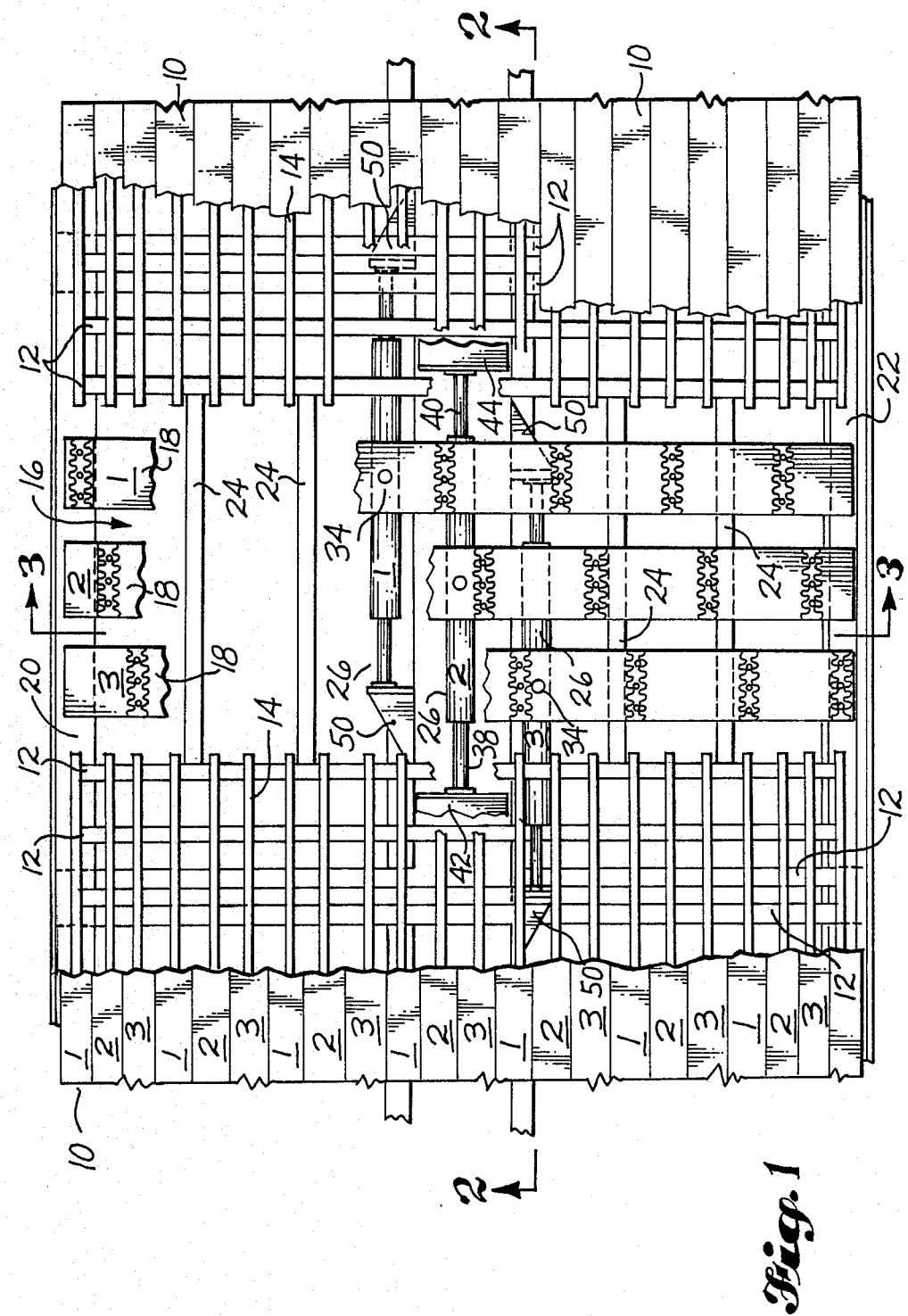
FIG. 1 is a top plan view of a reciprocating floor conveyor, with portions cut away for the purpose of better illustrating other portions.
Figure 14:
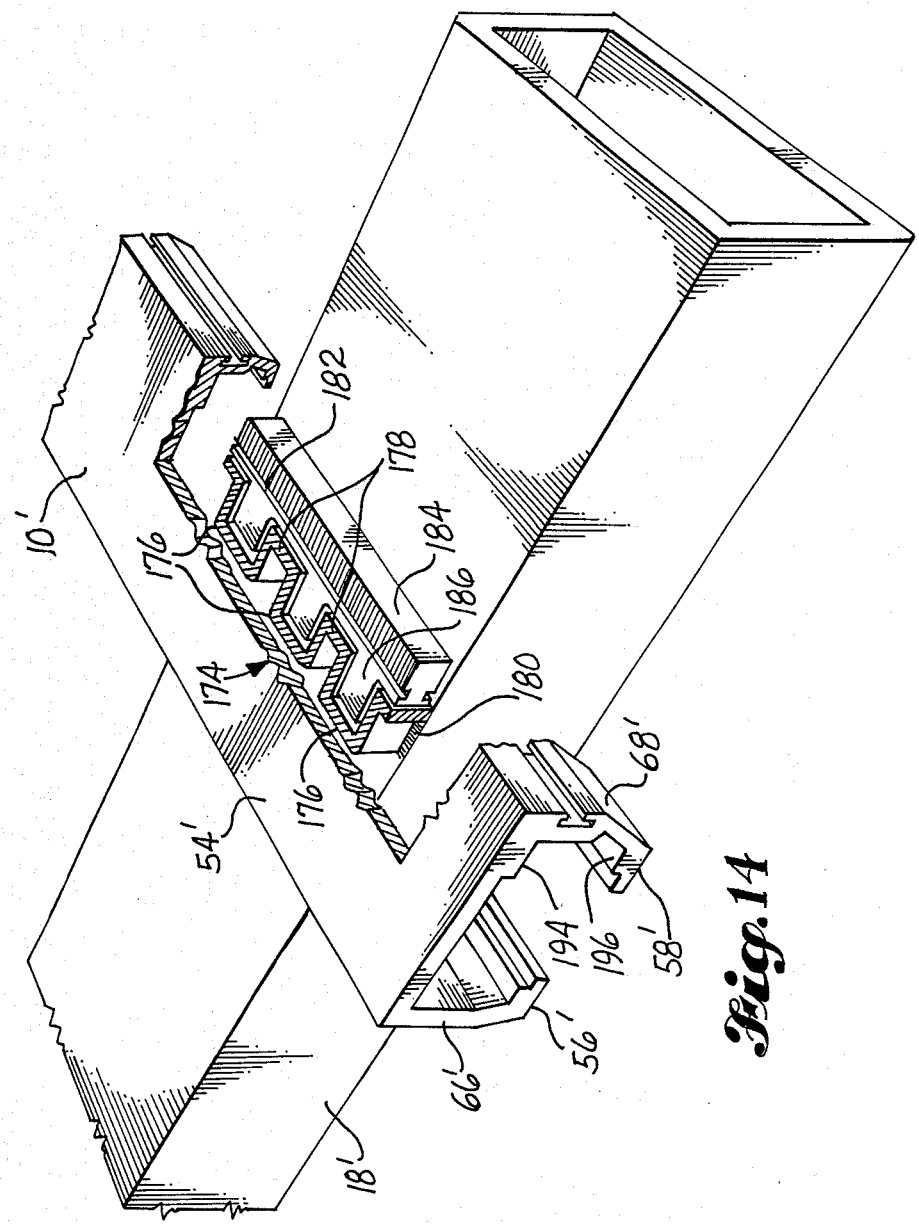
FIG. 14 is a fragmentary isometric view of a second embodiment of the invention, said view showing an end portion of a transverse drive beam, and an intermediate portion of a floor member, with a foreground portion of the floor member cut away to illustrate the components of a plug-together connection.

The reciprocating floor conveyor shown by FIG. 1 comprises a plurality of floor members 10 mounted adjacent each other for longitudinal reciprocation. By way of typical example, the floor members 10 are divided into three sets. The floor members 10 of set one are identified by the numeral "1". The floor members 10 of set two are identified by the numeral "2". The floor members 10 of set three are identified by the numeral "3".

The floor comprises a framework composed of a plurality of longitudinally spaced apart transverse support beams 12. It also comprises a plurality of longitudinally extending guide beams 14. The guide beams 14 set down onto and are rigidly connected to the transverse support beams 12 (FIGS. 2 and 7). There is a guide beam 14 for each floor member 10. The relationship of the floor members 10 and the guide beams 14 is hereinafter described in some detail.

The floor frame includes a space 16 which is devoid of guide beams 14. This space 16 extends the full width of the floor. Three transverse drive beams 18 are located in this space 16. The floor members 10 of set one are all connected to one of the drive beams 18. Accordingly, the drive beam 18 for set one is also designated "1". In similar fashion, the floor members 10 of set two are connected to a transverse drive beam 18 which is designated "2". The floor members 10 of set three are connected to a transverse drive beam 18 which is designated "3".

As best shown by FIG. 3, the transverse drive beams 18 may rest at their ends on frame members 20, 22. In span regions inwardly of their ends the beams 18 may rest on the upper surfaces of beams 24. The beams 24 extend between, and at their ends are connected to, the two transverse support beams 12 which are at the opposite ends of the space 16.

The reciprocating floor comprises a linear hydraulic motor 26 for each set of floor members 10. The motor 26 for the first set is designated "1". The motor 26 for the second set is designated "2". The motor 26 for the third set is designated "3".

The particular installation that is illustrated includes a longitudinal center beam 28 of channel form. The motor 26 for set "2" is located within the beam 28. A longitudinal slot 30 is formed in the top wall 32 of the beam 28. A drive pin 34 extends vertically through the slot 30. At its lower end it is connected to a central part of a moving central portion 36 of the motor 26. Each motor 26 includes fixed end portions 38, 40. As best shown by FIG. 1, the end portions 38, 40 of the motor 26 for set "2" are at their outer ends connected to frame members 42, 44 which span transversely across the interior of the beam 28. Motor 26 for set "1" is mounted outwardly adjacent sidewall 46 of beam 28. Motor 26 for set "3" is mounted outwardly adjacent the second wall 48 of beam 28. The end portions 38, 40 of the motors 26 for sets "1" and "3" are at their outer ends secured to support brackets 50 which are connected to the walls 46, 48.

As best shown by FIG. 1, motors 26 for sets "1" and "3" are offset longitudinally in opposite directions from the motor 26 for the set "2" for the purpose of centering their movable central portions 36 below the drive beams 18 for the sets "1" and "3". Drive pins 34 extend vertically between and interconnect the drive beams 18 and the movable portions 36 of the motors 26.

The motors 26 may be of the type which are disclosed by my copending application Ser. No. 905,370, filed Sept. 8, 1986 and entitled Drive/Frame Assembly for a Reciprocating Floor. A difference is that the center wall for the traveling cylinder housing is constructed to be axially long enough so that an opening can be formed through it for receiving a drive pin 34. The contents of my application Ser. No. 905,370 now U.S. Pat. No. 4,821,868 are hereby incorporated herein by this specific reference to the application.

In accordance with the present invention, the connection between each floor member 10 and its transverse drive beam 18 is a plug-together connection. That is, one member includes a socket and the other includes an insert which is snugly received in the socket. The socket may also be termed a "box" and the insert may also be termed a "pin".

In the illustrated embodiment, the socket or box is built into the floor member 10. By way of typical and therefore nonlimitive example, it may take the form of two substantially identical side parts 52, 54 which fit inside the floor member 10. Each side part 52, 54 has an outer portion which is positionable vertically between the top 55 of the floor member 10 and the bottom flange 56, 58 on its side of the floor member 10. Each part 52, 54 include an inner portion comprising spaced apart projections 60 which are separated by recesses 62. When the parts 52, 54 are located within the floor member 10, the projections 60 and recesses 62 are above and in alignment with an open space that is between the bottom flanges 56, 58. The parts 52, 54 may be secured to the floor member 10 by screw fasteners 64 which extend through openings in the sidewalls 66, 68 of the floor member and screw into threaded openings 70 formed in the parts 52, 54. The snug interfit of the parts 52, 54 within the floor member 10, together with the screw fastener 64, rigidly connect the parts 52, 54 to the floor member 10. The projections 60 and recesses 62 together define a socket or box in the nature of an opening in a jigsaw puzzle.

The second component of the connector is an insert or pin member 72 which is connected to a transverse drive beam 18. It may be secured to the drive beam 18 by use of screw fasteners 74 which extend through openings in the member 72 and screw into threaded openings provided in the drive beam 18.

As illustrated, member 72 has a pattern of projections 76 and recesses 78 which project laterally outwardly from both of its sides. The projections and recesses 76, 78 are sized and shaped to snugly fit into the socket or box formed by the projections 60 and recesses 62. Member 72 is like a piece of a jigsaw puzzle which fits into an opening of the same size and shape. The box formed by the projections 60 and recesses 62 and the insert or pin 72 formed by the projections 76 and recesses 78 are each complementary to the other. The interfitting projections and recesses 60, 78 and 76, 62 increase the surface area of contact between the interfitting parts or components of the connection.

As will be evident, the connection together of the joint components merely involves an alignment of the socket or box with the insert or pin and then a downward or vertical movement of the floor member 10.

As illustrated, the vertical dimension of member 72 is larger than the vertical dimension of the floor member 10. Accordingly, the socket or box engages only the upper portion of the insert or pin 72. The depth of interfit, and the straight up and down surfaces at the interfit, prevents the floor members from rolling or pitching.

My aforementioned application Ser. No. 59,376, filed June 4, 1987, and entitled "Bearing System for Reciprocating Floor Conveyor", and my aforementioned application Ser. No. 680,069, filed Dec. 10, 1984, and entitled "Bearing System for Reciprocating Floor Conveyor" disclose slide bearings for the floor members which are constructed in a manner that will allow the floor members to be swept into place from above. My aforementioned application Ser. No. 58,156, filed June 4, 1987, and entitled "Hold Down Member for a Reciprocating Floor Conveyor", discloses hold down members which are positioned on the guide beams for the floor members and which function to resist upward movement of the floor members up off their guide beams and/or bearings. The hold down members are also constructed to allow the floor members to be snapped into place from above.

An embodiment of the bearing and an embodiment of the hold down member will now be described.

In FIG. 9, a hold down member 80 is shown spaced below a longitudinal guide beam 14. FIG. 2 shows the hold down member 80 positioned on the longitudinal guide beam 14.

The floor member 10 has a top wall 54, opposite sidewalls 66, 68 and a pair of bottom flanges 56, 58. The floor member 10 is in the nature of a downwardly opening channel member. The flanges 56, 58 are spaced apart, in coplanar parallelism, and are both parallel with and offset below the top wall 54. In preferred form, the flanges 56, 58 include reduced thickness portions 82, 84 at their inner edges, and shoulders 86, 88 inwardly bounding the edge portions 82, 84.

As is per se known, sidewall 68 includes a longitudinal slot in which a seal 90 is received. The seal 90 makes sealing contact with a sidewall 66 of an adjoining floor member 10.

In preferred form, the hold down member 80 comprises a pair of opposite sidewalls 90, 92, two top parts 94, 96 and a bottom wall 98. The bottom wall 98 extends between and interconnects the bottoms of the sidewalls 90, 92.

Top part 94 is connected to the top part of sidewall 90 and top part 96 is connected to the top part of sidewall 92. The top parts 94, 96 extend laterally inwardly from the tops of the sidewalls 90, 92 and each has an inner boundary that is adjacent the inner boundary of the other. Hold down member 80 includes a pair of hold down wings 100, 102, one on each of its sides.

Hold down wing 100 is connected to side 90 and hold down wing 102 is connected to sidewall 92. Each hold down wing 100, 102 slopes downwardly and outwardly from the top part 94, 96 on its side of the hold down member 80. Each hold down wing 100, 102 includes a lower edge 104, 106. The lower edges 104, 106 are spaced apart laterally a distance that is wider than the space between the bottom flanges 56, 58 of the floor member 10 (FIG. 11). The distance between the outer surfaces of the sidewalls 90, 92 in the region of hold down member 80 below the hold down wings 100, 102, is smaller than the distance between the flanges 56, 58 of the floor member 10 (FIG. 11).

An inner space 108 is defined horizontally by and between the sidewalls 90, 92, and vertically by and between the top parts 94, 96 and the bottom wall 98. This space 108 is sized to receive at least one guide beam 14. The illustrated embodiment shows a space 108 which is sized to receive a single guide beam 14. My aforementioned copending application Ser. No. 59,376 discloses using two spaced apart guide beams for supporting and guiding each floor member. The bearings are constructed to fit onto both of the guide beams. A hold down member 80 could be constructed in a similar manner. That is, the space 108 could be made wide enough to receive in it two laterally spaced apart guide beams 14.

Spaces 110, 112 are defined by and between the hold down wings 100, 102 and the sidewalls 90, 92. The hold down member 80 is constructed from a structural plastic material which is tough and relatively rigid, but which can bend. The wings 100, 102 are capable of bending inwardly into the spaces 110, 112 until the horizontal distance between the outer portions of the lower edges 104, 106 equal the width of the space that is defined by and between the flanges 56, 58 of the floor member 10.

The hold down member 80 is installed onto the guide beam 14 in a quick and easy manner. The hold down member 80 is moved into a position below the guide beam 14, as shown by FIG. 9. Then, as shown by FIG. 10, forces are applied to the sidewalls 90, 92, for spreading them apart in the manner illustrated. This opens up the space between the inner boundaries of the top parts 94, 96, until such space is large enough to receive the width dimension of the guide beam 14. Then, the hold down member 80 is moved upwardly. It is moved upwardly until the top parts 94, 96 are above the guide beam 14. Upon this happening spring energy within the portions of the hold down member 80 which were stressed causes the side parts of the hold down member 80 to move inwardly, to place the sidewalls 90, 92 into contact with side portions of the guide beam 14, and position the top parts 94, 96 above the top of the guide beam 14 (FIG. 11).

Preferably, each sidewall 90, 92 includes a single rib 114, 116 which extends longitudinally of the space 108, projects laterally into the space 108, and is situated closer to the bottom wall 98 than to the top parts 94, 96. Preferably also, the top parts 94, 96 include ribs 118, 120 which extend longitudinally of the space 108 and project downwardly into the space 108. The horizontal distance between the ribs 114, 116 is preferably slightly less than the nominal width dimension of the guide beam 14. The vertical distance between the ribs 118, 120 and the bottom wall 98 is preferably slightly less than the nominal vertical dimension of the guide beam 14. This results in the hold down member 80 having to spread apart slightly in order to accommodate the guide beam 14 within the space 108. It also compensates for tolerance differences in the manufacture of the hold down member 80 and the guide beams 14.

FIG. 5 is a fragmentary top plan view of a portion of a floor which is slightly wider than four floor members and is of a length to include a pair of transverse support beams 12. FIG. 5 shows a bearing 122 positioned at each location where a longitudinal guide beam 14 intersects a transverse support beam 12. The hold down members 80 are placed on the longitudinal guide beams 14 in span regions of these beams 14, i.e. the regions which span between the support beams 12.

FIGS. 6–8 disclose the bearing construction which is part of the subject matter of my aforementioned copending application Ser. No. 59,376.

Bearing 122 comprises a top wall 124, sidewalls 126, 128, bottom flanges 130, 132 side wings 134, 136 and gussets 138, 140, 142, 144. The sidewalls 126, 128 slope outwardly and downwardly as they extend from the top wall 124 down to lower edges 146, 148. A slot 150 is defined vertically between lower edge 146 and wing 134. On the opposite side of the bearing, a slot 152 is formed vertically between lower edge 148 and wing 136. The bearing has a width dimension at the level of the lower edges 146, 148 which is wider than the horizontal space between the flanges 56, 58 of the floor member 10. The gussets 138, 140, 142, 144 include inner end surfaces 154, 156, 158, 160 which slope downwardly and outwardly from their location of connection to the wings 134, 136. When the bearings 122 are set down on the longitudinal guide beams 14, these end surfaces 154, 156, 158, 160 contact the upper corners of the longitudinal guide beams 14. Owing to this arrangement, and further owing to the fact that the bearings 122 are constructed from a structural plastic material which has spring characteristics, one need only press vertically downwardly on the bearing 122 in order to install it onto the longitudinal guide beam 14. The gusset end surfaces 154, 156, 158, 160 function, in response to the downward force, to cam the side parts of the bearing apart so as to expand the horizontal space between the lock flanges 130, 132 a sufficient amount to allow passage of the longitudinal guide beam 14 into the inner space of the bearing 122. The bearing 122 moves downwardly as the longitudinal guide beam 14 moves into the same space. When ribs depending from the top wall 124 of the bearings 122 contact the top wall of the longitudinal guide beam 14 the lock flanges 130, 132 will have passed below the lower surface of the longitudinal guide beam 14. When this happens, the spring energy in the bearing material 122 will cause the side parts of the bearing 122 to spring inwardly, to place the lock flanges 130, 132 below the longitudinal guide beam 14.

The hold down members 80 and the bearings 122 are all installed in the manner that has been described. Then, the floor members 10 are installed. This is done by setting a floor member downwardly on top of the bearings 122 and the hold down members 80 which are attached to its longitudinal guide beam 14. FIG. 11 shows the position of the floor member 10 on the hold down member 80. As shown, the inner edge portions 82, 84 of the floor member flanges 56, 58 rest on the sloping surfaces of the hold down wings 100, 102. The horizontal space between the flanges 56, 58 is larger than the width dimensions of the bearings 122 at the tops of the bearings. As a result, an upper portion of the bearings 122 will fit into the space between the bottom flanges 56, 58 and the inner edge portions 82, 84 of the bottom flanges 56, 58 will contact the sloping sidewalls 128, 126 of the bearings 72. Next, all the installer has to do is step downwardly onto the floor member 10. Spaces 162, 164 are defined laterally between the bearing sidewalls 128, 126 and the sidewalls of the longitudinal guide beam 14. Positioning ribs 166, 168 extend inwardly and downwardly from the bearing sidewalls 128, 126. Owing to the fact that they are sloped, the ribs 166, 168 will bend in response to a squeezing together of the bearing sidewalls 126, 128. A downward force applied on the floor member 10 causes it to move downwardly relative to the bearing 122. As it so move, the contact made by the inner edge portions 82, 84 of the bottom flanges 56, 58 with the bearing sidewalls 128, 126 squeezes the bearing sidewalls 128, 126 together. The bearing sidewalls 128, 126 move into the spaces 162, 164. At the same time, the ribs 166, 168 bend. This continues until the inner edge portions 82, 84 of the flanges 56, 58 move downwardly below the lower edges 148, 146 into slots 170, 172. When this happens, the spring energy stored in the ribs 166, 168, and the upper corner portions of the bearing 122, causes the side portions of the bearing 122 to move outwardly into the position shown by FIG. 6.

In similar fashion, and as illustrated by FIGS. 12 and 13, the downward force applied on the floor member 10 causes the floor member 10 to move downwardly relative to the hold down member 80. As floor member 10 moves downwardly, the inner edge portions 82, 84 of its flanges 56, 58 bend the hold down wings 102, 100 downwardly (FIG. 12). As they bend, the hold down wings 100, 102 move into the spaces 110, 112. This continues until the edge portions 84, 82 of the flanges 58, 56 are below the lower edges 104, 106 of the hold down wings 100, 102. Then, stored spring energy in the hold down wings 100, 102 cause the wings 100, 102 to spring outwardly into their static positions (FIG. 13).

When the floor members 10 are installed they will sit down onto the tops 74 of the bearings 122. They might also set down onto the top portions 94, 96 of the hold down members 80. If so, the hold down members 80 will also function as bearings for the floor members 10.

During in-use movement of the floor members 10, upward components of force may act on the floor members 10, wanting to lift them upwardly. Referring to FIG. 13, an upward movement of a floor member 10 will cause contact between the inner edge portions 84, 82 of the floor member flanges 58, 56 and the lower edges 146, 148 of the sidewalls 126, 128 of the bearings 122. Thus, any floor member 10 wanting to move upwardly will want to move with it the bearing 122 in the location that is experiencing the upward component of force. The location of the inner edge portions 82, 84 of the floor member flanges 56, 58 within the bearing slots 170, 172 acts to connect the floor member 10 to the bearing 122 in such a way that the upward component of force is distributed by the floor member 10 to all of the bearings to which it is connected. Also, an upward force applied to the bearings 122 will make the side parts of the bearing to want to move outwardly. This movement is resisted by the gussets 138, 140, 142, 144 and is further resisted by contact between outer edges of the wings 134, 136 and outer edges of wings 134, 136 on adjoining bearings 122.

FIG. 13 clearly illustrates how the hold down member 80 functions to further resist upward movement of a floor member 10 in response to an upward component of force applied to it during longitudinal movement of the floor member 10. As the floor member 10 moves upwardly, the inner edge portions 82, 84 of its flanges 56, 58 contact the lower edges 106, 104 of the hold down wings 102, 104. Owing to the fact that the hold down member 80 is open at the top, any upward force applied on the wings 100, 102 will tend to move the side portions of the hold down member 80 inwardly rather than outwardly. In preferred form, the shoulders 86, 88 are present and the lower wing edges 102, 104 make abutting contact with the shoulders 86, 88. This contact acts to stiffen the hold down wings 100, 102. As shown by FIG. 13, the contact of the wings 100, 102 with the floor member flanges 56, 58 in effect connects together the floor member 10, the hold down member 80 and the longitudinal guide beam 14. This connection serves to apply some of the upward component of force to the longitudinal guide beam 14. The longitudinal guide beam 14 then distributes this force along its length to at least some of its locations of connection to the transverse support beams 12.

The hold down member 80 can be used in some or all of the span regions of the longitudinal guide beams 12. In most installations it is only necessary to use the hold down members 80 in some of the span regions.

Each floor member 10 is set down on the bearings 122 and hold down members 80 on its guide beam 14 with its joint component (e.g. box 60, 62) vertically aligned with the joint component (e.g. pin 72) on its drive beam 18. Floor member 10 is then moved downwardly to connect together the joint components and stop the floor member in place on the bearings 122 and hold down member 80.

FIGS. 14–19 disclose a modified form of plug-together connection between a floor member and its transverse drive beam or other element of its drive system. In these views the transverse drive beam is shown in the form of a tubular beam whereas in the first embodiment it is shown in the form of a solid metal beam.

Figure 18:
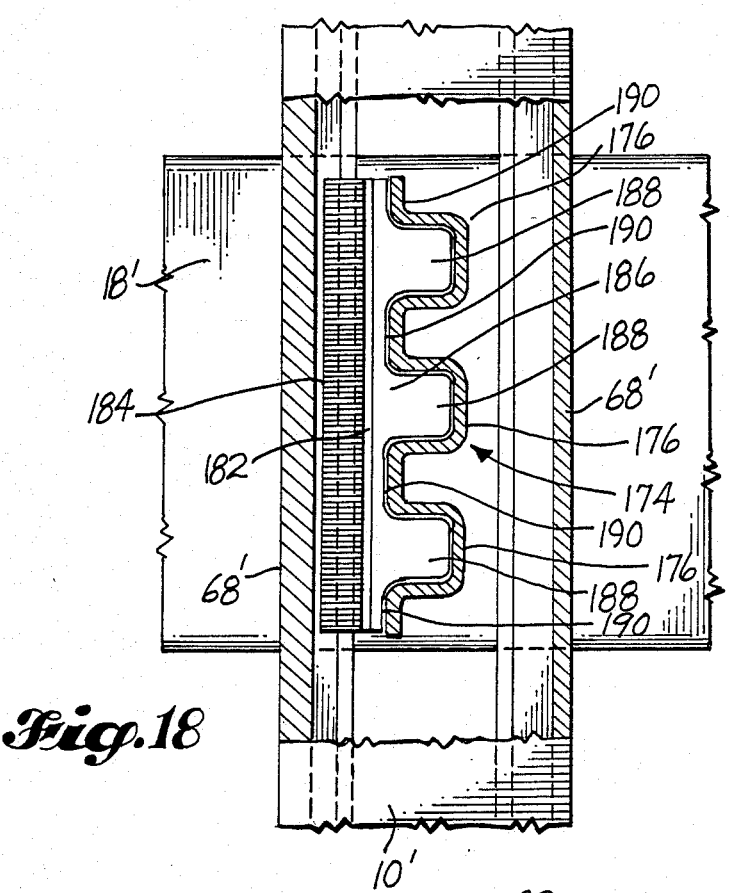
FIG. 18 is a sectional view taken substantially along line 18—18 of FIG. 16.
Figure 19:
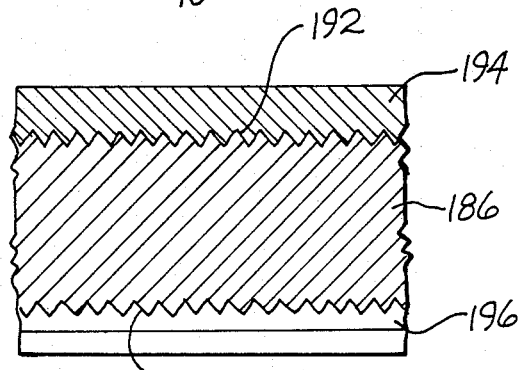
FIG. 19 is an enlarged scale fragmentary sectional view taken substantially along line 19—19 of FIG. 15.

The embodiment of FIGS. 14–19 comprises a load transferring joint member 174 that is welded to the drive beam 18'. Member 174 and beam 18' may both be constructed from steel. Member 174 is corrugated. The corrugations 176, 178 form recesses which are substantially square in shape but with rounded corners. Member 174 may be welded at 180, where its zig-zag lower edge makes contact with the upper surface of the beam 18'. As best shown by FIG. 18, the member 174 is substantially centered laterally of the floor member 10'.

The member 174 constitutes one component of a plug-together connection between the floor member 10' and the drive beam 18'. The second component is in the nature of a block 182 which is received within the floor member 10'. Block 182 comprises a generally bar-shaped outer portion 184 and an inner portion 186. The inner portion 186 is composed of spaced apart projections 188 and recesses 190 between the projections. The projections and recesses 188, 190 are of a size and shape to interfit with one side of the connector member 174.

The outer portion 184 comprises top and bottom serrations 192. The serrations 192 extend laterally of the floor member 10'. Floor member 10' includes upper and lower portions 194, 196 which are provided to make a connecting engagement with the serrations 192. Portion 194 may be a thickened region of the top 54', adjacent a side 68'. Region 196 is the upper portion of a flange 58'.

Member 186 has a width dimension that will allow it to be moved through the open space between the flanges 56', 58'. Member 186 is in this manner placed inside of the floor member 10'. Then, a squeezing pressure is applied between it and the sidewall 68', for the purpose of moving member 186 laterally of the floor member 10', to place its outer portion 184 into the space that is vertically between the bottom flange 58 and the portion 194 of the top panel 54' above it. Portions 194, 196 do not include serrations. The lateral movement of member 186 into the floor member 10' causes the serrations 192 to cut into the regions 194, 196. Preferably floor member 10' and member 186 are both constructed from aluminum. Serrations 192 cut into the aluminum member 186 will cut their way into the portions 194, 196 of the floor member 10'. When member 186 is installed in the floor member 10', the engagement between the serrations 192 and the floor portions 194, 196 will anchor member 186 against movement relative to floor member 10'.

As shown by FIG. 18, the recesses formed by the corrugations 176 open laterally towards the projections 188. In the vertical direction, these recesses form sockets in which the projections 188 are received. Accordingly, the corrugations 176 form the socket or box component of the joint. The projections 182 form the insert or pin component of the joint.

As in the first embodiment, the floor member is set down onto the bearings of its guide beam 14, in a position with the projections 184 aligned with the sockets formed by the corrugations 176. As shown by FIG. 15, the projections 188 extend downwardly and the corrugations 176 extend upwardly by amounts sufficient so that lower portions of the projections 188 are received within upper portions of the recesses at a time when the floor member 10' is setting up on the bearings 122. As previously described, when the floor member is first set down on the bearings 122, the upwardly tapering upper portions of the bearings 122 will enter into the space between the floor member flanges 56', 58' until contact is made between the inner edges of the flanges 56', 58' and the sloping side surfaces 126, 128 of the bearings 122. This positioning of the floor member 10' on the bearings 122 is illustrated in my aforementioned co-pending application Ser. No. 680,069. When the floor member 10' is in such a position on the bearings 122, the projections 188 of member 186 are partially down into, or partially engaged with, the sockets formed by the corrugations 176. The dimension or partial engagement is designated 198 in FIG. 15. Accordingly, the projections 188 are put into partial engagement with the sockets at the time the floor member 10' is laid down onto the bearings 122 of its guide beam 14. Then, a downward pressure (e.g. foot pressure) is applied to the floor member, to snap it onto its bearings 122. This downward movement of the floor member 10' completes the engagement of the projections 188 with the recesses formed by the corrugations 176. The floor member 10' is moved down into the position shown by FIGS. 16 and 17.

The engagement between the projections 188 and the recesses formed by the corrugations 176 is preferably quite snug or tight in the direction longitudinally of the floor member 10'. However, gaps are provided between the free ends of the projections 188 and the base walls of the recesses, and between the corrugations 178 and the base surfaces of the recesses 190, so that the floor member 10' can move sideways for the purpose of adjusting its position relative to the other floor members 10'. In a typical installation the adjustment afforded by the gaps is in the range of ⅛ in. to 3/16 in.

The reciprocating floor conveyor shown by FIG. 20 is an alternate embodiment of that shown by FIG. 1 and comprises a plurality of floor members 10" mounted adjacent each other for longitudinal reciprocation. As in the first embodiment, the floor comprises a framework composed of a plurality of longitudinally spaced apart transverse support beams 12 and a plurality of longitudinally extending guide beams 14. The function of this embodiment of a reciprocating floor conveyor is substantially identical to that previously described and shown in FIG. 1. Shown in FIG. 20 is an alternate plug-together connection means comprising an abutment block 198 which is mountable to a floor member 10" and an engageable push/pull member 200 mounted to transverse drive beams 18".

The channeled floor member 10" shown in FIGS. 21–28 is essentially identical to those described above (indicated as 10 and 10'). The floor member 10" is comprised of a top panel 54", side panels 66", 68" extending downwardly therefrom, and lower flanges 56", 58" extending inwardly from the sides 66", 68". The sidewall 68" also has a flexible gasket 90 for bearing against a sidewall 66" of an adjacent floor channel member 10".

A preferred embodiment of an abutment block 198 is shown in place within a channel member 10" in FIGS. 21–23. The block 198 substantially fills the space defined between channel sidewalls 66", 68" and the space defined between the top panel 54" and the lower flanges 56", 58". The block 198 may extend downwardly through the opening defined between the lower flanges 56", 58". The distance in which the block 198 extends downwardly is determined b the spacing desired between the floor member 10" and the transverse drive member 18". A preferred means of attaching the block 198 to the floor member 10" is by forming a plurality of corresponding holes substantially vertically through the top panel 54" of the floor channel, through the block 198, and through the lower flanges 56", 58" of the floor channel member 10" and inserting pins 202 downwardly therethrough. A preferred attachment pin is a roll pin which is per se commonly known in the art. In a preferred embodiment, the block 198 has outwardly extending portions 204, 206 which are below and substantially parallel to the floor channel lower flanges 56", 58". These extentions 204, 206 define longitudinal channels 205, 207 in the sides of the block 198 for receiving the floor channel lower flanges 56", 58". In this embodiment, it is preferred that corresponding holes also be formed in the outwardly extended block portions 204, 206 and that the attachment pins 202 be extended downwardly therethrough. In this embodiment, the attachment pin 202 is placed under a combination of shear stresses as the floor member is reciprocated longitudinally. A single shear is placed on the pin at the point where it connects the block 198 with the upper floor channel panel 54". The attachment pins 202 are placed in double shear in the region where the pins 202 connect the block 198 with the lower flanges of the floor channel 56", 58" and the outward extensions 204, 206. Attachment in this manner provides substantial longitudinal load transfer capacity between the floor members 10" and the abutment block member 198 of the plug-together connection.

Figure 24:
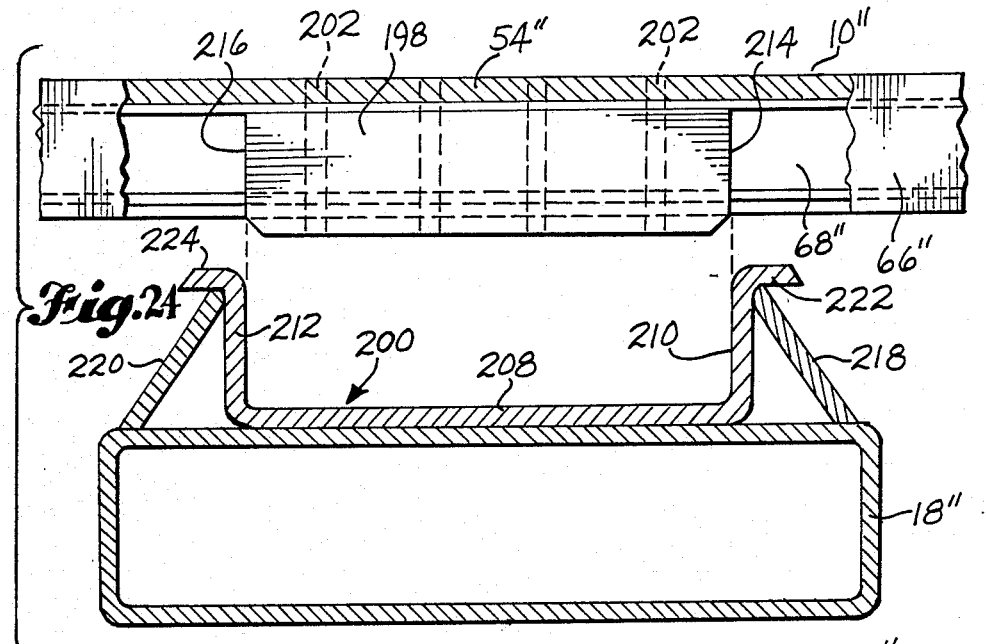
FIG. 24 is a transverse sectional view through a drive member and push/pull cradle showing a floor member with an attached abutment block aligned to be moved downwardly into engagement with the cradle.
Figure 25:
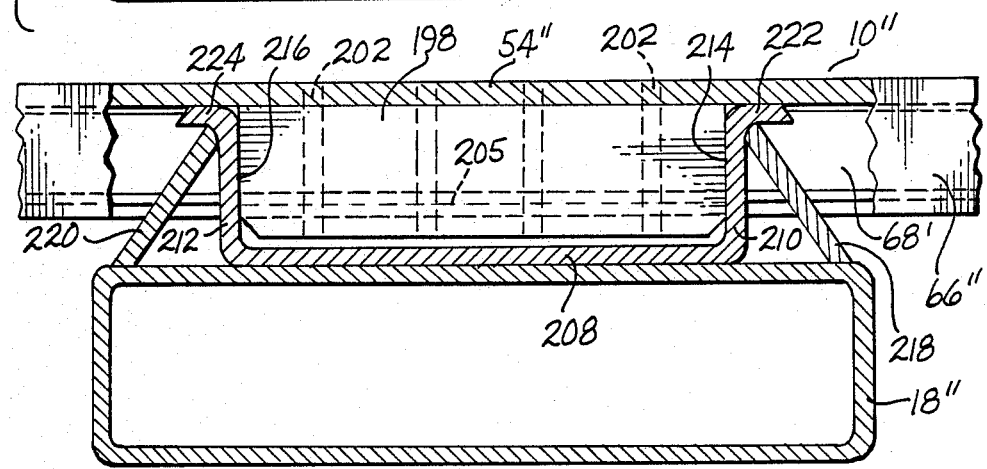
FIG. 25 is a view like FIG. 24, but showing the floor member installed with the block engaged within the cradle.

A push/pull member 200 which is capable of vertically receiving and longitudinally bearing against the abutment block 198 is attached to a transverse drive beam 18". In preferred form, the push/pull member 200 is in the form of a cradle having a substantially U-shaped form and comprising an elongated bight portion 208 attached to the transverse drive member 18" and a pair of longitudinally opposed vertically upturned arm portions 210, 212 which snugly engage end portions 214, 216 of an abutment block 198 in the longitudinal direction. The vertical portions 210 and 212 of the cradle and the end portions 214, 216 of the block are substantially transversely straight and are substantially parallel to one another. As shown by FIGS. 24 and 25, a floor member 10" with an abutment block 198 attached may be aligned above a push/pull cradle of the drive member 18" and then moved vertically downwardly into longitudinal engagement. The end portions 214, 216 of the block 198 snugly engage with the vertical portions 210, 212 of the push/pull cradle in the longitudinal direction. As shown in FIGS. 21-23, the lateral width of the vertical push/pull members 210, 212 is less than the distance between the lower flanges 56", 58" of the floor channel member 10". This may allow a limited amount of lateral float of the floor members 10" for the purpose of adjusting relative lateral position between adjacent floor members 10". The amount of lateral float is limited by the distance between the lower flanges 56", 58" and the lateral width of the vertical push/pull members 210, 212.

Figure 26:
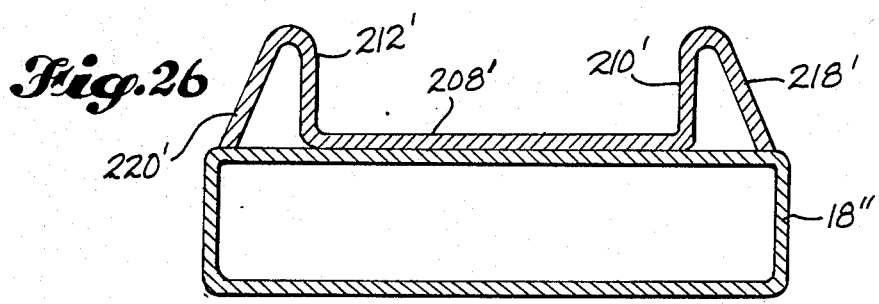
FIG. 26 is a transverse sectional view of a drive member with an alternative embodiment of a push/pull cradle attached thereon.
Figure 27:
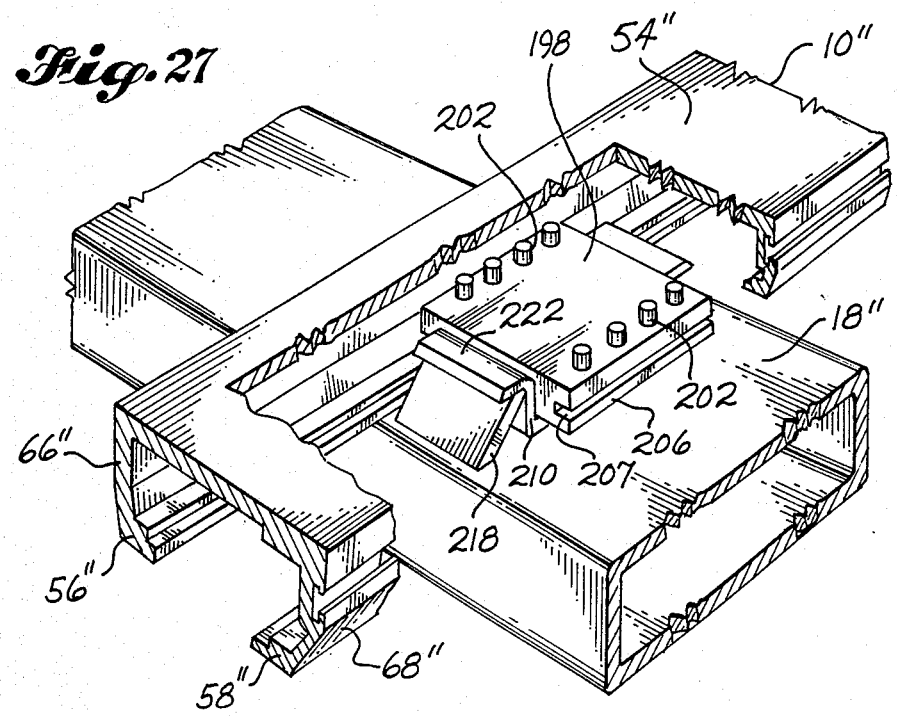
FIG. 27 is a fragmentary isometric view showing a drive member and a floor member with a portion of the floor member cut away to show a block engaged with a cradle.

In preferred form, the vertical push/pull members 210, 212 are supported by diagonal braces 218, 220. The vertical push/pull members 210, 212 may have outwardly turned end portions 222, 224 under which the diagonal braces 218, 220 may fit to support the end portions 222, 224 of the vertical push/pull members 210, 212. An alternative embodiment for end-bracing the cradle is shown in FIG. 26. In this embodiment the cradle has a horizontally flattened bight portion 208' and longitudinally opposed, integrally formed vertical portions 210', 212' and diagonal brace portions 218', 220'. The function of this embodiment is virtually identical to that described above.

As in the case of the first embodiment, the embodiment shown by FIGS. 14-17 and 20-27 may also include some of the hold down members 80 spaced along the guide beams 14.

Figure 28:
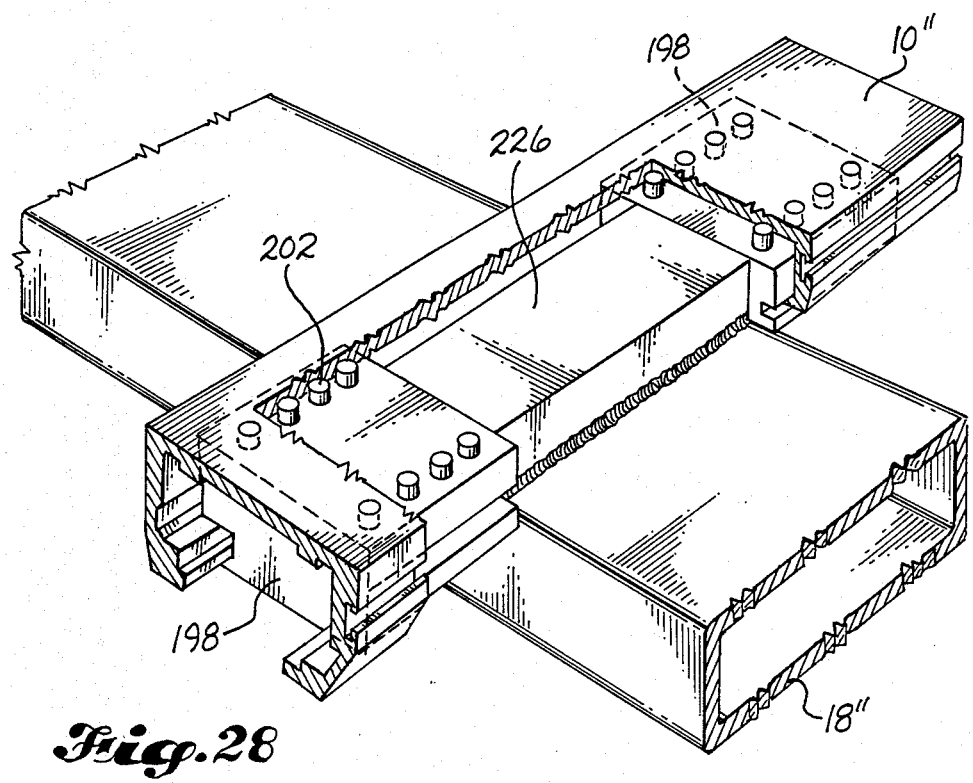
FIG. 28 is a fragmentary isometric view showing a drive member and a floor member with a portion of the floor member cut away to show a push/pull member engaged between a pair of abutment blocks.

In other embodiments, the box or socket component and the pin or insert component can be constructed in almost an endless number of ways. In existing installations, a socket may be built into the floor member which is of a size and shape to make a plug together engagement with the old style of connector (e.g. element 16 in my U.S. Pat. No. 4,492,303). One possible way of constructing such an embodiment is shown in FIG. 28. This embodiment uses a pair of longitudinally spaced apart abutment blocks 198 attached to the floor channel member 10" and a vertical projection 226 attached to a transverse drive beam 18" which functions as a push/pull means. Such an embodiment maintains the qualities of allowing a vertically plugged-together engagement when the floor member 10" is snapped into place from above. The vertical projection 226 should snugly engage between the abutment blocks 198 so as to provide a transfer of the longitudinal back and forth motion of the transverse drive beam 18" to the floor member 10". As in the above-described embodiments, the abutment blocks 198 and the vertical projection 226 should have transversely straight end portions to allow a slight lateral float of the installed floor members 10".

Stated another way, the pin component and the box or socket should be substantially equal in length (i.e. direction longitudinally of the floor member) so that the fit of the pin component into the box or socket is snug in the longitudinal direction. However, the component (e.g. box component in FIGS. 20-27) which extends upwardly from the drive beam 18" should be narrower than the space between the flanges 56", 58", so that the floor member 10" and pin component 198 can float sideways an amount sufficient to compensate for any misalignment which might exist between adjacent floor members.

Of course, given the information that is set forth above, one could construct other embodiments of plug together connections. The systems which have been described are all presented for purposes of illustration and not limitation. I am only to be limited to the wording of the claims which follow, interpreted in accordance with the rules of patent claim interpretation, including use of the doctrine of equivalents.

What is claimed is:

1. A reciprocating floor conveyor, comprising:
   a plurality of floor members;
   a support and guide means for each floor member on which the floor member is supported for back and forth longitudinal travel;
   drive means for longitudinally moving the floor members in one direction for advancing a load and for longitudinally retracting the floor members in the opposite direction;
   said drive means having engageable means for longitudinally pushing and pulling said floor members integral therewith; and
   said floor members having longitudinally engageable abutment means integral therewith,
   wherein said pushing/pulling means and said abutment means are sized to plug together vertically and to engage snugly in the longitudinal direction when each floor member is moved downwardly onto its support and guide means, and said engagement causes the back and forth directional motion of the drive means to be transferred to corresponding floor members,
   wherein each floor member is of a channel form and has a top panel, a pair of opposite sides projecting downwardly from the top panel, and a pair of bottom flanges projecting inwardly from the sides and defining a space between said flanges, and wherein said abutment means includes a block having transversely straight end boundaries, being located, at least in part, vertically, between said bottom flanges and said top panel, and having a width extending substantially between said opposite sides, said block being attached to the floor member by a plurality of pins which pass substantially vertically through corresponding openings formed in the block and the top panel and one of said bottom flanges of the floor member.

2. A reciprocating floor conveyor according to claim 1, wherein said block extends downwardly beyond said space between said bottom flanges a distance which maintains a predetermined vertical spacing between the floor member and the drive means.

3. A reciprocating floor conveyor according to claim 2, wherein said block has outwardly extending portions below and substantially parallel to said bottom flanges, and having openings formed therein such that said pins may further extend downwardly through said outwardly extending block portions.

4. A reciprocating floor conveyor according to claim 1, wherein said pushing/pulling means has spaced apart vertical members with transversely straight inner boundaries said vertical members being engageable with opposite ends of said block such that one vertical member pushes against one end of the block as the floor member is being advanced in one direction, and a second vertical member pulls against a second end of the block when the floor member is being retracted in the opposite direction.

5. A reciprocating floor conveyor according to claim 4, wherein said vertical members are longitudinally opposed upturned ends of a substantially U-shaped cradle having a bight portion of sufficient length to receive and engage the block snugly in the direction of longitudinal travel.

6. A reciprocating floor conveyor according to claim 5, wherein said vertical members have bracing means between the vertical members and the drive means.

7. A reciprocating floor conveyor, comprising:
a plurality of floor members;
a support and guide means for each floor member on which the floor member is supported for back and forth longitudinal travel;
drive means for longitudinally moving the floor members in one direction for advancing a load and for longitudinally retracting the floor members in the opposite direction;
said drive means having engageable means for longitudinally pushing and pulling said floor members integral therewith; and
said floor members having longitudinally engageable abutment means integral therewith,
wherein said pushing/pulling means and said abutment means are sized to plug together vertically and to engage snugly in the longitudinal direction when each floor member is moved downwardly onto its support and guide means, and said engagement causes the back and forth directional motion of the drive means to be transferred to corresponding floor members,
wherein said abutment means includes longitudinally spaced apart vertical members having transversely straight inner boundaries, and said pushing/pulling means includes a vertical projection having transversely straight outer boundaries which are snugly engageable between said longitudinally spaced apart vertical members of said abutment means in the longitudinal direction.

* * * * *